(No Model.)
E. WERNER.
CAR STARTER AND BRAKE.
No. 333,367. Patented Dec. 29, 1885.
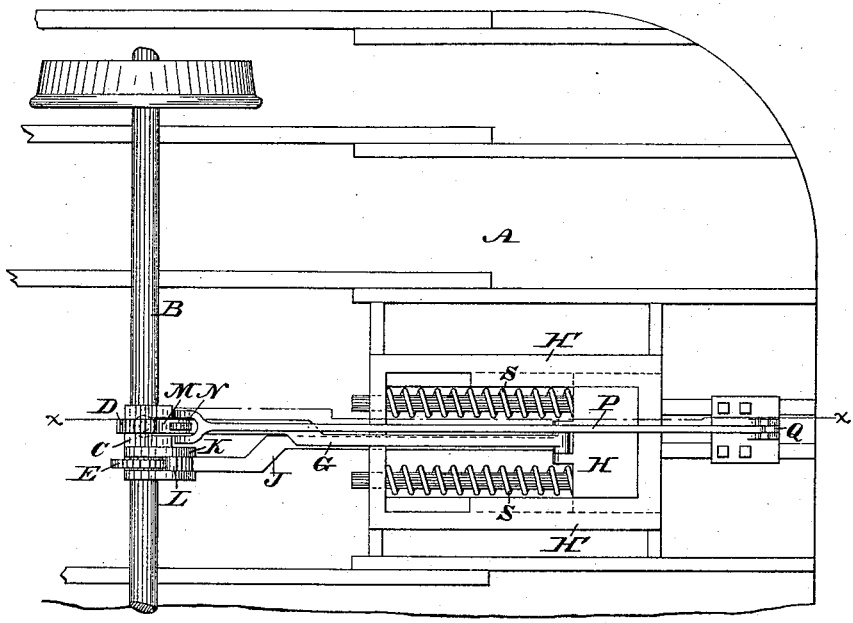
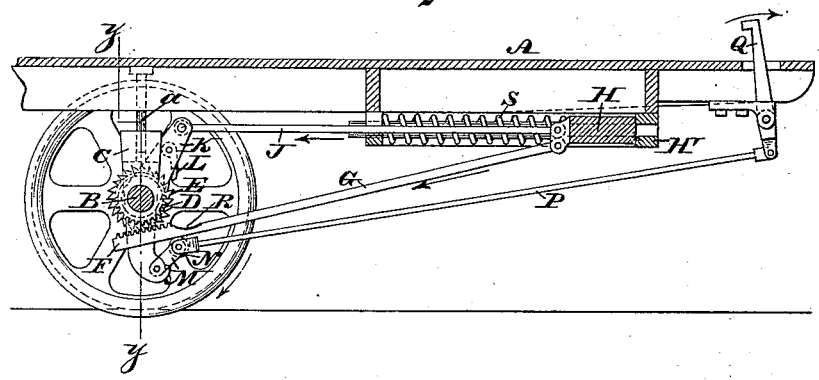
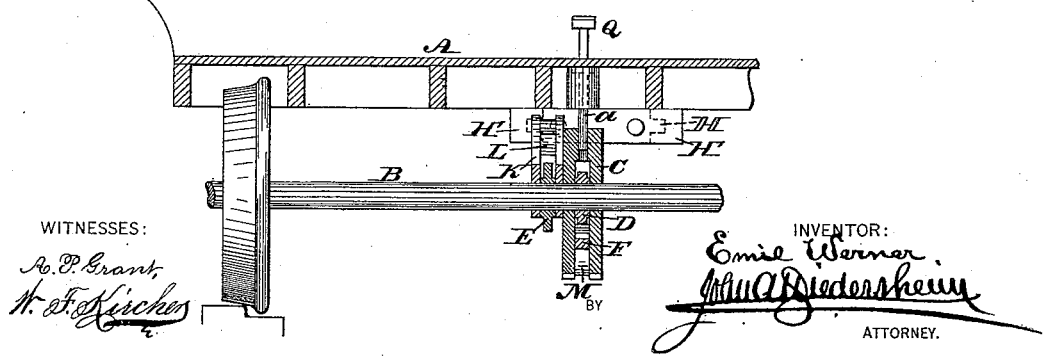
WITNESSES:
A. P. Grant,
W. F. Kirchen
INVENTOR:
Emil Werner
BY John A. Wiedersheim
ATTORNEY.

UNITED STATES PATENT OFFICE.

EMIL WERNER, OF NEW YORK, N. Y., ASSIGNOR OF ONE-HALF TO AUGUST W. GORNER, OF PHILADELPHIA, PENNSYLVANIA.

CAR STARTER AND BRAKE.

SPECIFICATION forming part of Letters Patent No. 333,367, dated December 29, 1885.

Application filed October 7, 1885. Serial No. 179,209. (No model.)

*To all whom it may concern:*

Be it known that I, EMIL WERNER, a citizen of the United States, residing in the city, county, and State of New York, have invented a new and useful Improvement in Car Brakes and Starters, which improvement is fully set forth in the following specification and accompanying drawings, in which—

Figure 1 represents a bottom view of a car brake and starter embodying my invention. Fig. 2 represents a longitudinal vertical section thereof in line $x\ x$, Fig. 1. Fig. 3 represents a transverse vertical section in line $y\ y$, Fig. 2.

Similar letters of reference indicate corresponding parts in the several figures.

My invention consists in a car brake and starter having means for causing the power of a spring to be readily exerted on the car-wheel, all as will be hereinafter set forth.

It also consists of a novel brake employed in connection with starting mechanism.

Referring to the drawings, A represents the bottom of the body of a car, and B represents one of the axles thereof.

C represents a hanger which depends from the bottom A, and is connected therewith by a pin or stud, $a$, which permits the car-body to rise and fall, it being noticed that the axle B is passed through said hanger. Keyed or otherwise secured to the axle is a pinion, D, and a ratchet, E, with the former of which is adapted to engage a rack, F, the connected bar G of which is pivoted to a slide-head, H, whose supports H' are on the under side of the bottom A of the body of the car. To the head H is also pivoted a bar, J, whose opposite end is pivoted to an arm, K, the latter being freely supported on the axle B and carrying a pawl, L, which is adapted to engage with the ratchet E. The hanger C is bifurcated and receives the pinion D and rack F between its arms, and to its lower end is pivoted a rotary arm or lifting-piece, M, which is provided on its upper end with a roller, N, and connected with a rod or bar, P, the latter being pivoted to a lever or treadle, Q, which is within convenient reach of the driver of the car. On the rack-bar G, at the inner termination of the teeth of the rack F, is a depression forming a brake-shoe, R, the operation whereof will be hereinafter set forth.

Bearing against the sliding head H and a suitable portion of the bottom A of the body of the car are springs S, which are adapted to be compressed by the motion of said head.

When the parts are in their normal position, the rack-bar G rests on the lifting-piece M, so that the rack F is clear of the pinion D, and the pawl L is removed from the teeth of the ratchet E, all as shown in Fig. 2.

When the car is in motion and to be stopped, the driver operates the lever or treadle Q, whereby the piece M is raised, thus elevating the rack F and causing it to engage with the pinion D, whereby sliding motion is imparted to the bar G, thus moving the head H rearward and causing the compression of the spring S. The bar J is also moved rearward, thus carrying back the pawl L such distance that it engages with one of the teeth of the ratchet E. As soon as the teeth of the rack F clear the teeth of the pinion D the depression R is forced against the periphery of said pinion, the driver continuing to operate the lever or treadle Q, and thus the surface of said depression acts as a brake-shoe, so that a brake for the car is provided. As soon as the car is stopped, and it is desired to start it again, the driver lets go the lever or treadle Q, whereby the piece M is lowered and the rack F drops clear of the pinion D. The spring S, being no longer controlled, exerts its pressure on the head H, thus advancing the bar J and arm K, whereby the pawl L, which is engaged with the ratchet E, imparts the power of the spring S to the axle of the wheel, and consequently rotates the same and starts the car.

When it is desired to apply the brake for quick stoppage of the car, the lever or treadle Q is operated similarly to that above stated, so that the shoe R is rapidly raised and caused to exert its holding-power on the axle.

Having thus described my invention, what I claim as new, and desire to secure by Letters Patent, is—

1. In a car-starter, an axle passing through the forks of a bifurcated hanger loosely attached to the bottom of a car, in combination with a pinion rigidly connected to said axle and within the forks of said hanger, a bar having a rack at one end thereof, and a lifter provided with a roller and pivotally connected to the lower portion of the said hanger, substantially as and for the purpose set forth.

2. In a car-starter, a car-axle, in combination with a ratchet rigidly connected therewith, an arm hung loosely on said axle, a pivoted bar connected with said arm, a sliding head to which said arm is pivoted, and a spring pressing against said head, substantially as and for the purpose set forth.

3. An axle, in combination with a pinion, and a ratchet connected to said axle, a bifurcated hanger, a bar with a rack, said pinion and rack being between the forks of the hanger and adapted to operate said rack, a sliding head provided with a spring secured to one end of said rack-bar, and a second bar connected to said head and pivotally attached to an arm loosely mounted on the said axle, the said arm carrying a pawl adapted to operate the said ratchet, substantially as described.

4. In a car-starter, a pinion on the car-axle, in combination with a rack the bar whereof is formed with a brake-shoe, substantially as and for the purpose set forth.

5. An axle, in combination with the bar G, formed with a shoe, R, the lifting-arm M, the bar P, and the operating treadle or lever Q, substantially as and for the purpose set forth.

EMIL WERNER.

Witnesses:
JOHN A. WIEDERSHEIM,
A. P. GRANT.